United States Patent
Haldeman

(10) Patent No.: US 12,465,797 B2
(45) Date of Patent: *Nov. 11, 2025

(54) FIRE HYDRANT REPAIR TOOL, AND SYSTEMS AND METHODS OF USING SAME

(71) Applicant: WASHINGTON SUBURBAN SANITARY COMMISSION, Laurel, MD (US)

(72) Inventor: James Haldeman, Poolesville, MD (US)

(73) Assignee: Washington Suburban Sanitary Commission, Laurel, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 18/585,849

(22) Filed: Feb. 23, 2024

(65) Prior Publication Data

US 2024/0316379 A1   Sep. 26, 2024

Related U.S. Application Data

(63) Continuation of application No. 17/949,041, filed on Sep. 20, 2022, now Pat. No. 11,911,642, which is a continuation of application No. 16/839,891, filed on Apr. 3, 2020, now Pat. No. 11,452,895.

(60) Provisional application No. 62/847,376, filed on May 14, 2019.

(51) Int. Cl.
 A62C 99/00    (2010.01)
 A62C 35/20    (2006.01)
 B25B 13/50    (2006.01)

(52) U.S. Cl.
 CPC ............ *A62C 99/009* (2013.01); *B25B 13/50* (2013.01); *A62C 35/20* (2013.01)

(58) Field of Classification Search
 CPC ....... B25B 13/50; B25B 13/48; B25B 13/481; B25B 13/02; B25B 13/06; B25B 13/08
 See application file for complete search history.

(56) References Cited

U.S. PATENT DOCUMENTS

| | | | | |
|---|---|---|---|---|
| 2,116,770 A | * | 5/1938 | Scillia | E03B 9/04 137/328 |
| 3,768,775 A | * | 10/1973 | Archer | F16K 27/08 251/291 |
| 3,797,286 A | * | 3/1974 | Saporito | F16K 35/10 137/364 |
| 4,348,922 A | * | 9/1982 | Harris | B25B 13/50 81/180.1 |
| 6,364,285 B1 | * | 4/2002 | Stinnett | F16K 31/46 251/293 |

(Continued)

*Primary Examiner* — David B. Thomas
(74) *Attorney, Agent, or Firm* — Ballard Spahr LLP

(57) ABSTRACT

A fire hydrant repair tool is provided for removing a main valve of a fire hydrant, wherein the main valve has a pair of ring tabs extending upwardly therefrom. The fire hydrant repair tool can include a valve key having a first receptacle and a second receptacle that are configured to receive, respectively, the first and second ring tabs. Each of the first and second receptacles can define a first face that is configured to bias against the first side of a respective ring tab of the first and second ring tabs, and a second face that is configured to bias against the second side of a respective ring tab of the first and second ring tabs. A shaft can be coupled to the valve key.

19 Claims, 12 Drawing Sheets

(56) References Cited

U.S. PATENT DOCUMENTS

| | | | | |
|---|---|---|---|---|
| 6,378,401 B1* | 4/2002 | Lordahl | ............... | B25B 13/56 |
| | | | | 81/124.2 |
| 6,776,068 B2* | 8/2004 | Reuschel | ............ | B25B 21/00 |
| | | | | 81/57.32 |
| 7,000,897 B2* | 2/2006 | Chick | ................. | F16K 31/46 |
| | | | | 251/293 |
| 10,549,408 B2* | 2/2020 | Choquette | ............. | B25B 13/481 |
| 11,452,895 B2* | 9/2022 | Haldeman | ............... | B25B 13/50 |
| 11,911,642 B2* | 2/2024 | Haldeman | ............... | B25B 13/50 |
| 2011/0308824 A1* | 12/2011 | Sigelakis | ............... | E03B 9/02 |
| | | | | 169/37 |
| 2012/0102702 A1* | 5/2012 | Mitchell | ............... | E03B 7/077 |
| | | | | 29/426.1 |
| 2019/0255686 A1* | 8/2019 | Choquette | ........... | B25B 13/5091 |

* cited by examiner

FIRE HYDRANT REPAIR TOOL, AND SYSTEMS AND METHODS OF USING SAME

CROSS-REFERENCE TO RELATED APPLICATION

This application is a continuation of U.S. patent application Ser. No. 17/949,041, filed Sep. 20, 2022, which is a continuation of U.S. patent application Ser. No. 16/839,891, filed Apr. 3, 2020, which claims the priority to and benefit of U.S. Provisional Patent Application No. 62/847,376, filed May 14, 2019. Each of these applications is hereby incorporated herein by reference in its entirety.

FIELD

This application relates to apparatuses and methods for repairing fire hydrants.

BACKGROUND

Fire hydrant crews frequently receive work orders to repair inoperable fire hydrants with broken main valves. The main valves for fire hydrants provided by various brands each have a different, custom upper plate that requires a respective specialized tool that engages particular features of the upper plate to remove the main valve from the body of the hydrant. Further, each brand can provide valves having multiples sizes (e.g., small and large), requiring a specialized tool for each valve size. Accordingly, no universal tool is available to engage and remove the main valves for fire hydrants of multiple, different brands. Instead, conventionally, fire hydrant crews carry a plurality of valve tools, one for each type of upper plate. Each of these valve tools is heavy and bulky, with a long shaft that consumes space in the vehicle of the repair crew.

Moreover, upper plates have upwardly extending projections, commonly referred to as "dog ears." Conventionally, most manufacturer-made valve repair tools engage the upwardly extending projections to remove the fire hydrant main valve. However, in some circumstances, the upwardly extending projections can be broken off, rendering the conventional tools unable to engage the upper plate to remove the main valve.

SUMMARY

Described herein, in various aspects, is a fire hydrant repair tool for removing a main valve of a fire hydrant. The main valve can have a central rotational axis, an upper surface, a first ring tab extending upwardly from the upper surface, and a second ring tab extending upwardly from the upper surface opposite the first ring tab relative to a radial axis that is perpendicular to the rotational axis. Each of the first and second ring tabs can have a first side and a second side. The fire hydrant repair tool can comprise a valve key comprising a first receptacle and a second receptacle that are configured to receive, respectively, the first and second ring tabs. Each of the first and second receptacles can define a first face that is configured to bias against the first side of a respective ring tab of the first and second ring tabs, and a second face that is configured to bias against the second side of a respective ring tab of the first and second ring tabs. The fire hydrant repair tool can further comprise a shaft having a longitudinal axis, a first end, and a second end that is spaced from the first end relative to the longitudinal axis. The first end of the shaft can be coupled to the valve key.

A method can comprise coupling a valve key to a shaft to form a valve key and shaft assembly. The valve key can define a first receptacle and a second receptacle that are configured to receive, respectively, first and second ring tabs of a main valve of a fire hydrant. Each of the first and second receptacles can define a first face that is configured to bias against the first side of a respective ring tab of the first and second ring tabs and a second face that is configured to bias against the second side of a respective ring tab of the first and second ring tabs. The method can further comprise lowering the valve key into the fire hydrant until the first and second ring tabs of the fire hydrant are received within the first and second receptacles of the valve key and applying a torque to the shaft to decouple the main valve from a body of the fire hydrant.

A kit can comprise a shaft and a plurality of valve keys. Each valve can comprise a first receptacle and a second receptacle that are configured to receive, respectively, first and second ring tabs of a particular fire hydrant main valve. Each of the first and second receptacles can define a first face that is configured to bias against a first side of a respective ring tab of the first and second ring tabs and a second face that is configured to bias against a second side of a respective ring tab of the first and second ring tabs.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description and appendix, which include examples, drawings, and claims. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an," and "the" include plural referents unless the context clearly dictates otherwise. Thus, for example, reference to "a tab" can include two or more such tabs unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

As used herein, the terms "optional" or "optionally" mean that the subsequently described event or circumstance may or may not occur, and that the description includes instances where said event or circumstance occurs and instances where it does not.

Figure 1A:
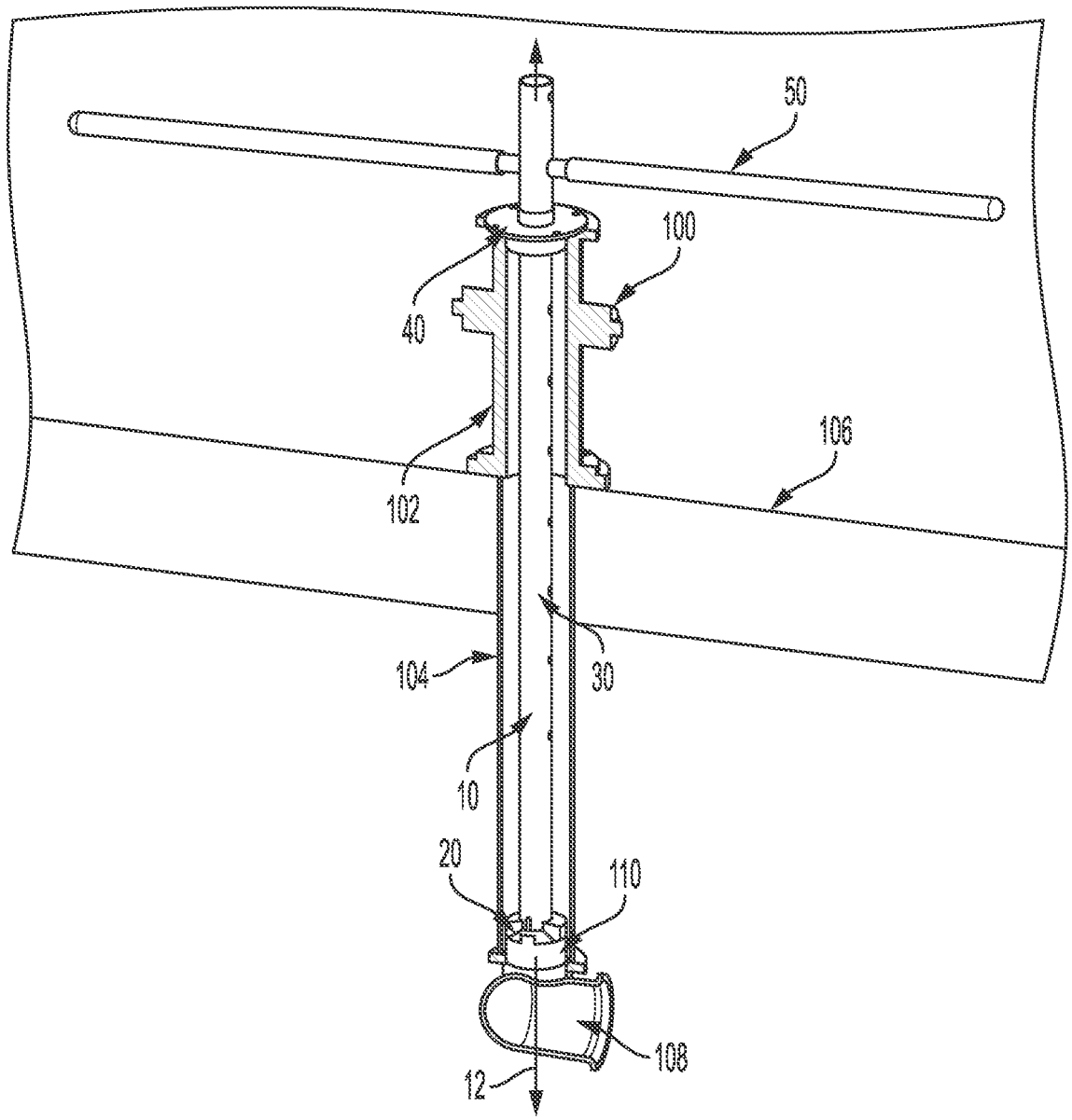
FIG. 1A is a perspective view of a fire hydrant system, comprising a fire hydrant main valve assembly having a main valve seat ring, and a fire hydrant repair tool in engagement with the main valve seat ring, in accordance with embodiments disclosed herein.
Figure 1B:
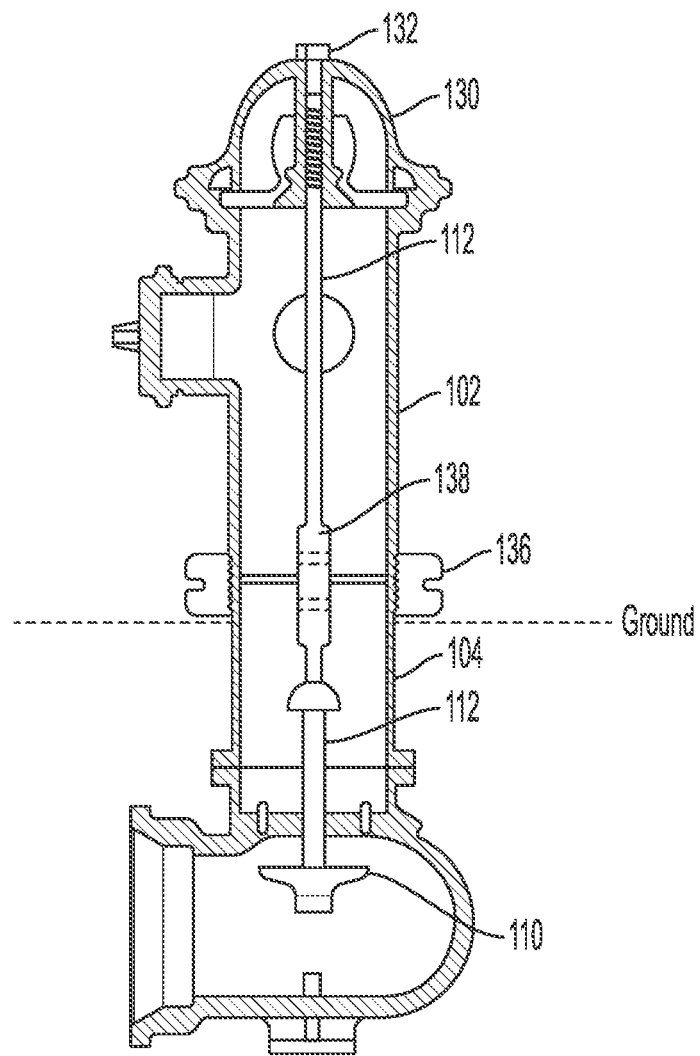
FIG. 1B is a cross sectional side view of a fire hydrant in accordance with embodiments disclosed herein.

Disclosed herein, in various aspects, and with reference to the Figures, are devices, systems, and methods for repairing a fire hydrant. Referring to FIGS. 1A-1B, a fire hydrant 100 can comprise a hydrant upper barrel 102 and a hydrant lower barrel 104 that couples to the hydrant upper barrel 102 via a breaker ring 136 at a grade surface (ground level, below which is dirt, asphalt, etc.) 106. The hydrant lower barrel 104 can further couple to a hydrant shoe 108 that couples to a water main and directs water from the water main into the hydrant lower barrel 104. A main valve 110 can be positioned proximate to the engagement between the hydrant lower barrel 104 and the hydrant shoe 108. The main valve 110 can threadedly couple to the body of the fire hydrant via threads that are centered about a central rotational axis 12. The hydrant upper barrel 102 can couple to a bonnet 130 comprising an operating nut 132 for turning the fire hydrant water flow on and off. A stem 112 (also shown partially in FIG. 1C) can couple between the operating nut and the main valve 110 so that rotation of the operating nut transfers to rotation of the main valve 110. The stem 112 can comprise a breakable coupling 138 approximately at grade surface 106.

Figure 1C:
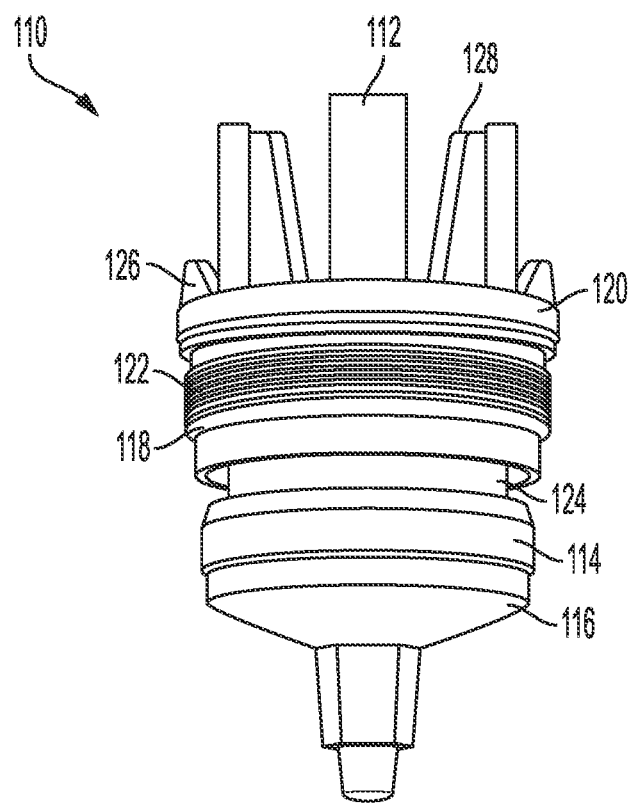
FIG. 1C is a side view of the main valve of the fire hydrant.
Figure 1D:
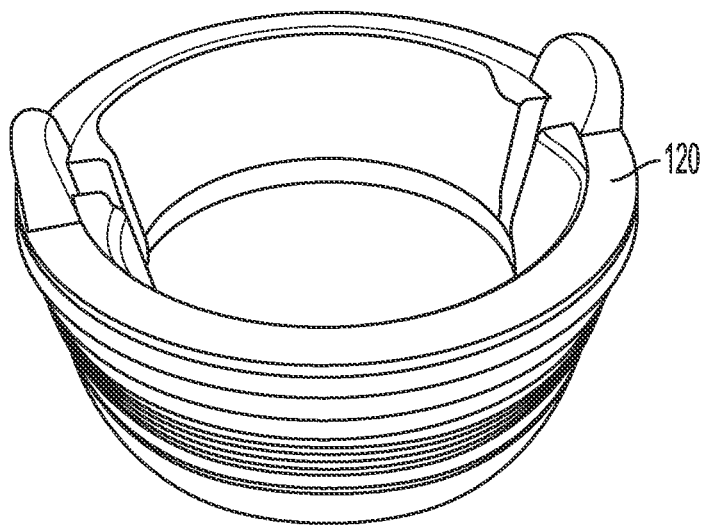
FIG. 1D is a perspective view of a seat ring of the main valve of FIG. 1C.
Figure 1E:
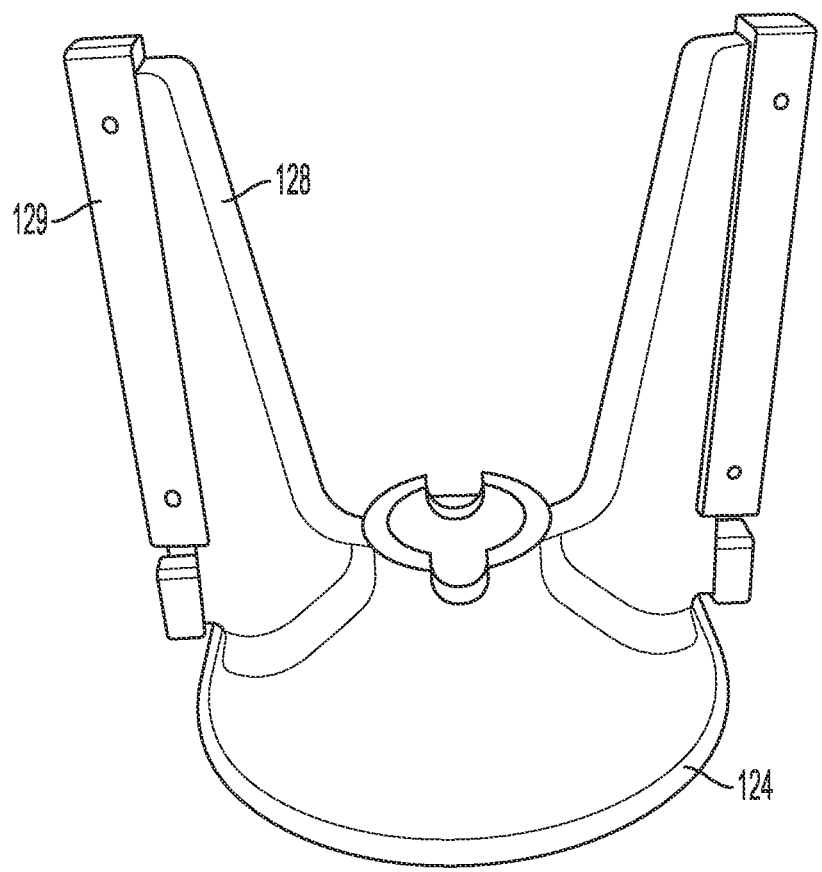
FIG. 1E is a perspective view of an upper plate of the main valve of FIG. 1C.

Referring to FIGS. 1C-1E, the main valve 110 can comprise a valve seat 114 and a seat retainer 116. The main valve 110 (referred to herein also the main valve assembly) can further comprise an upper plate 124 that is slidably received within a seat ring 120. The seat ring 120 can define outer seat ring threads 122. A pair of seat ring tabs 126 can be disposed at outer edges of the seat ring 120 and can extend upwardly from the seat ring 120. Although the geometry of the seat ring tabs 126 can differ between different main valves provided by different manufacturers, the seat ring for each main valve can define at least one portion (typically, a pair of portions) that extends upwardly relative to adjacent portions of the upper surface of the seat ring at or near the outer circumferential surface of the seat ring. The upper plate 124 can comprise a pair of vertical projections 128 (sometimes referred to as "dog ears") having seals 129 coupled thereto for sealing drain holes in the seat ring 120. As is known in the art, the drain holes in the seat ring can allow water in the upper and lower hydrant barrels to drain when the valve is shut off to prevent damage due to freezing. The vertical projections 128 can be radially inset from the seal ring tabs 126. One or more O-rings 118 can be disposed on the seat ring 120.

In various aspects, and with reference to FIG. 1A, a fire hydrant repair tool 10 can comprise a valve key 20 that is coupled to a shaft, which can be embodied as an extension tube 30. A torsion handle 50 can couple to the shaft and can be configure to apply torque to the shaft. An upper guide housing 40 can provide stability to the shaft to maintain the upper end of the shaft in place (i.e., inhibit movement of the shaft transverse to the rotational axis 12).

Figure 4:
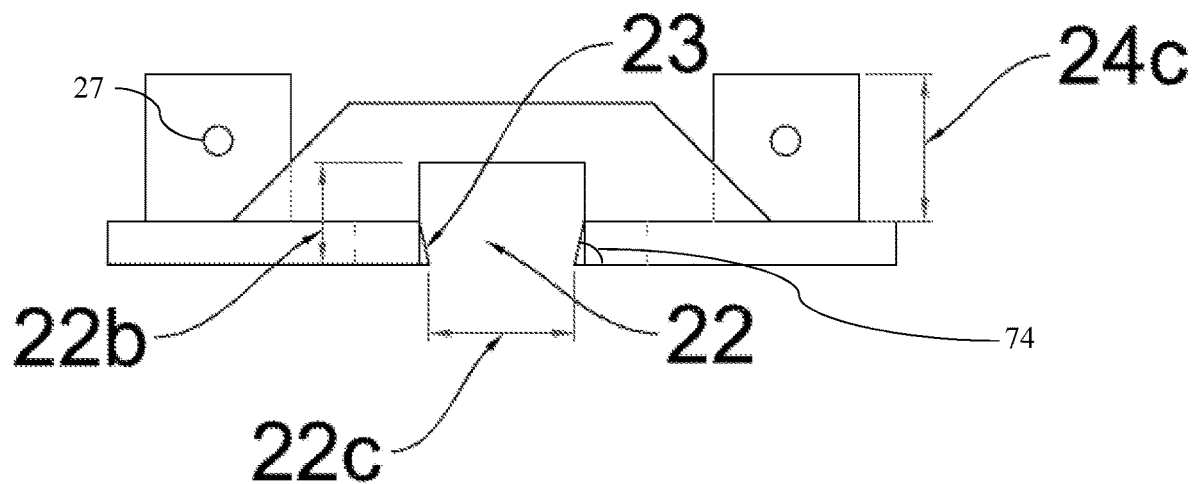
FIG. 4 is a side view of the exemplary main valve key as in FIG. 2.

Referring to FIGS. 1A, 1C, and 2-4, the valve key 20 can be configured to engage the main valve seat ring 120 of a fire hydrant. In particular, the fire hydrant repair tool 10 can engage the seat ring tabs 126 of the main valve seat ring 120 of the main valve 110 as described herein. By engaging the main valve seat ring tabs 126, the main valve assembly can be removed with or without an intact upper valve plate (e.g. with or without the vertical projections 128 of the upper plate 124, and regardless of whether the vertical projections 128 are damaged). Optionally, the valve key 20 can be specifically designed to engage a particular main valve seat ring (e.g., for a specific brand/manufacturer of a fire hydrant, and for the specific size of the valve for the given brand/manufacturer). For example, the valve key 20 can define a respective receptacle 22 that is configured to receive each valve seat ring tab 126. Each receptacle 22 can define first and second opposing surfaces 25a, 25b that are spaced apart by a spacing 22c (FIG. 4). The receptacle can have radial inset dimension (depth) 22a from the circumferential edge and a height 22b. The radial inset dimension 22a, height 22b, and spacing 22c can be selected so that a respective valve ring seat tab 126 can be received within the receptacle 22. The valve key 20 can optionally be rotationally symmetric. In some aspects, the valve key can comprise a lower plate 28 that can define respective notches 70. The notches 70 can at least partially define the receptacles 22. A pair of reinforcement members 29 can extend across the notches 70 and can extend upwardly sufficiently to provide the height 22b that allows clearance for receiving the tabs 126 of the main valve. The notches 70 can extend sufficiently inward to provide openings 72 to receive the vertical projections 128 of the upper plate 124. In some optional aspects, the tabs 126 of the valve ring 120 can have parallel (or generally parallel) side surfaces, and the first and second surfaces 25a, 25b of the receptacle 22 can correspondingly be parallel (or generally parallel) planar surfaces to engage the respective side surfaces of the tabs 126.

The valve key 20 can be positioned over the main valve seat ring 120 so that the tabs 126 are received within respective receptacles 22. Optionally, an operator can rotate the valve key 20 until the receptacles 22 align with the seat ring tabs 126 and the valve key 20 drops over the main valve seat ring with the seat ring tabs 126 received within respective receptacles 22. Rotation of the valve key in a first angular direction 26a about the rotational axis 12 can cause the first surfaces 25a of the receptacles 22 to bias against the seat ring tabs 126, thereby providing sufficient torque to rotate the main valve 110 and threadedly decouple the main valve 110 from the body of the fire hydrant 100. Likewise, rotation of the valve key 20 in a second angular direction 26b can cause the second surfaces 25b to bias against the tabs of the main valve 110, thereby rotating the main valve 110 to threadedly couple the main valve to the remainder of the fire hydrant 100.

The valve key 20 can further comprise teeth 23 that extend inward into the receptacle (i.e., toward the opposing side). The teeth 23 can optionally define an acute angle 74 relative to the bottom surface of the lower plate 28. The engagement teeth 23 can bite into the soft material of a hydrant main valve seat ring, inhibiting the main valve 20 key from slipping off. Optionally, the engagement teeth 23 can be hardened to inhibit wear of the teeth and extend the lifetime of the valve key 20.

Figure 5:
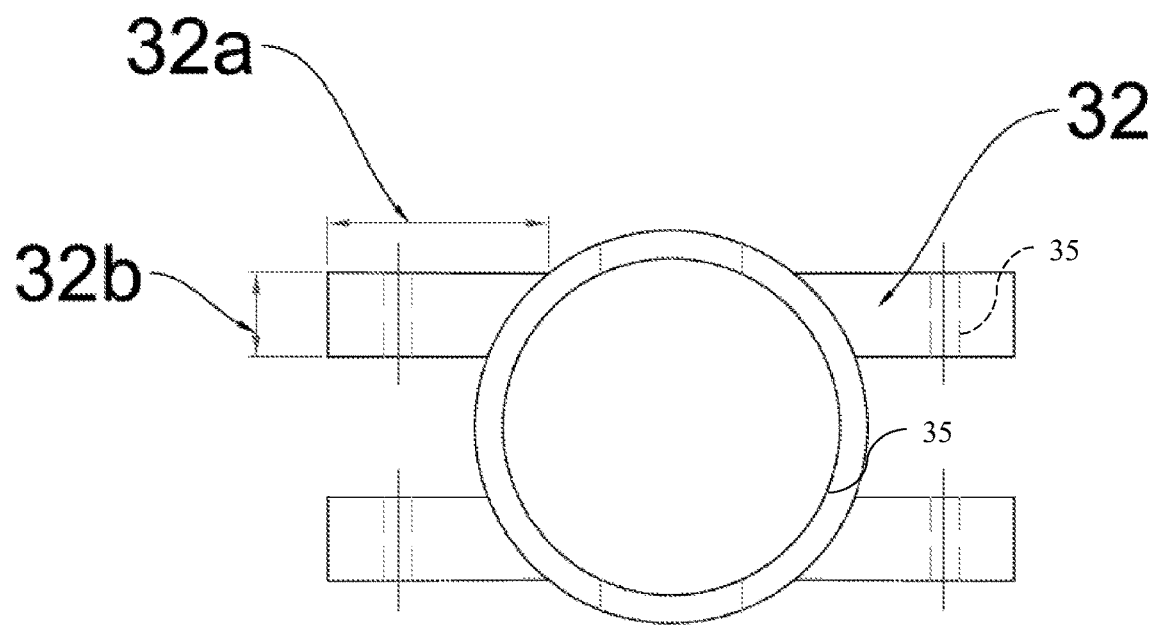
FIG. 5 is a top view of an extension tube of the fire hydrant system having features for fitting into various height fire hydrants and coupling to the exemplary main valve key as in FIG. 2.
Figure 6:
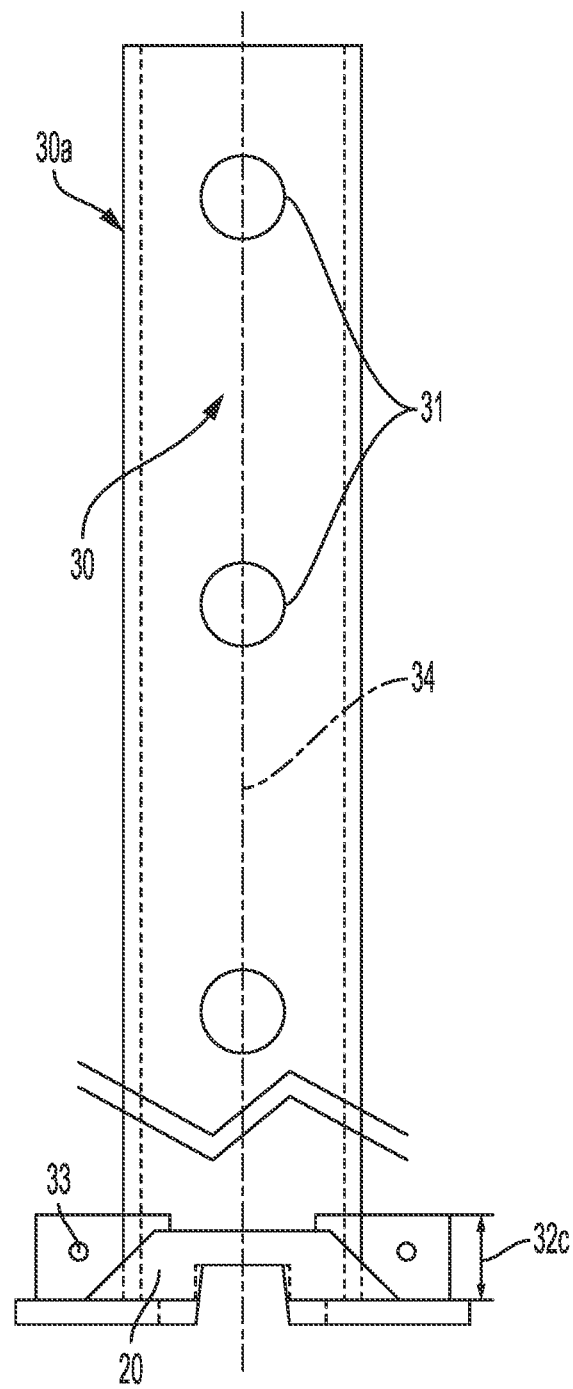
FIG. 6 is a side view of the extension tube as in FIG. 5 and the exemplary main valve key as in FIG. 2. As shown, the extension tube is coupled to an exemplary main valve key with quick-release pins.

Referring also to FIGS. 5 and 6, the valve key 20 can couple to the extension tube 30. In some aspects, the valve key 20 can comprise a pair of mating blocks 24 spaced away from the rotational axis of the valve key. Each of the mating blocks can have a length 24a and a width 24b. The extension tube 30 can comprise a respective pair of vertically extending plates 32 that can receive each mating block 24 of the valve key. Each pair of vertically extending plates 32 can have a length 32a and a thickness 32b. The mating blocks can each define a through-hole 27 that extends along the width of the block. The pair of vertically extending plates 32 can define through-holes 35 that can be axially aligned with the through-holes 27 of the mating blocks 24. Retaining pins 33 can be inserted into the aligned through holes to couple the extension tube 30 to the valve key 20. In alternative optional aspects, the valve key can be integrally formed with the extension tube 30.

Figure 9:
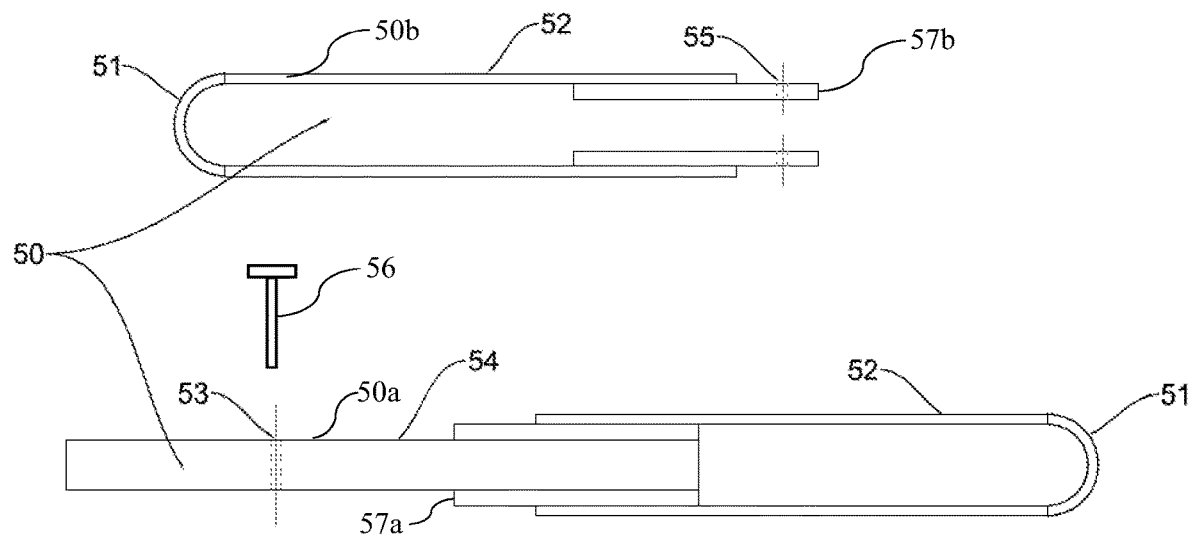
FIG. 9 is a side view of the torsion handle having the features for quick attachment to the extension tube and compact storage on a truck.

Referring to FIGS. 1, 6, and 9, the extension tube 30 can provide a mechanical connection between the torsion handle 50 and the main valve key 20. The extension tube 30 can define an inner bore therethrough for receiving the stem 112 of the fire hydrant 100. The extension tube 30 can define a plurality of spaced receiver holes 31 along its length to allow the repair tool to be used with fire hydrants of different heights. The torsion handle 50 can be fed through a receiver hole 31 positioned just above the top of the fire hydrant upper barrel 102. Thus, the selected receiver hole that the torsion handle is fed through can depend on the height of the fire hydrant. With the torsion handle 50 fed through the selected receiver hole, a force (e.g., a static force) can be applied to the torsion handle 50, creating torque on the extension tube. Torque can be transferred, first to the main valve key 20 through the mating blocks 24 and parallel plates 32 and finally to the hydrant main valve seat through the surfaces (and engagement teeth 23) of the main valve key tab receptacles 22. Optionally, the valve key 20 can be used with a CLOW fire hydrant main valve.

The torsion handle 50 can comprise a two-piece handle that can quickly be assembled to provide torsional force to the extension tube to loosen or tighten the main valve assembly. A first piece 50a of the two-piece torsion handle 50 can comprise a first tube 57a and a main shaft 54. The main shaft 54 can be configured (e.g., sized) to be fed through the receiver holes 31 in the extension tube 30. When the main shaft 54 is fully inserted into in the extension tube 30 so that an end of the first tube 57a engages the extension tube, a shaft pinhole 53 can be exposed. A second piece 50b of the two-piece torsion handle 50 can comprise a second tube 57b that can receive the main shaft 54. The second tube 57b can define an attachment pinhole 55 that can be aligned with the shaft pinhole 53. A handle retaining pin 56 can be inserted through the attachment pinhole 55 and shaft pinhole 53 to lock the torsion handle 50 in place (i.e., so that the torsion handle is coupled to the extension tube 30). The handle retaining pin 56 can be, for example, a wire-lock clevis pin with a wire retainer (not shown) that snaps closed to secure the pin. The two-piece design allows the torsion handle, when disassembled, to be compact for storage. The main shaft 54 can be made of high strength steel to resist bending of the shaft under high loading. Enlarged ergonomic handholds 52 can couple to the first and second tubes 57a, 57b. The ergonomic handholds 52 can be sized to provide a sturdy but comfortable surface for manual operation by a person. End caps 51 can be attached to the ergonomic handhold 52 to provide smooth closed-off ends of the torsion handle.

Figure 7:
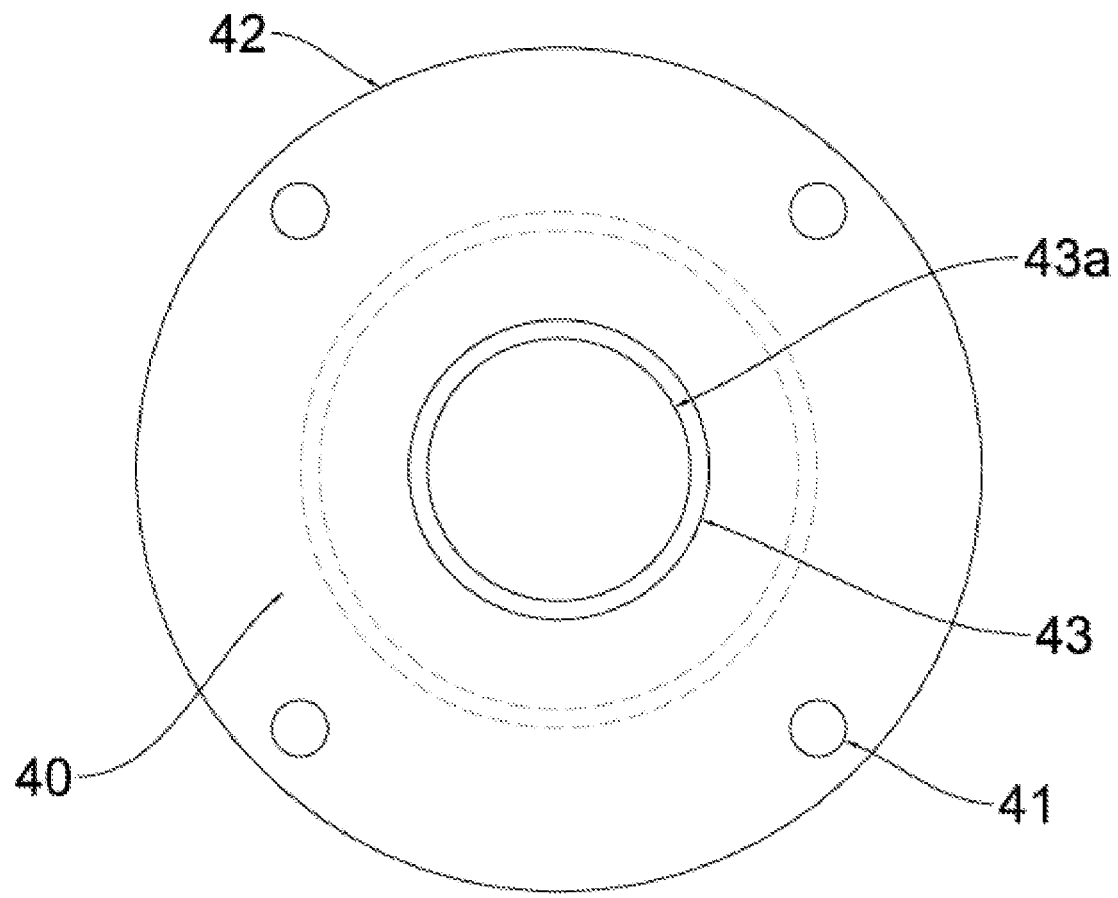
FIG. 7 is a top view of an upper guide housing of the fire hydrant repair tool having the features for stabilizing the extension tube when torsional forces are applied.
Figure 8:
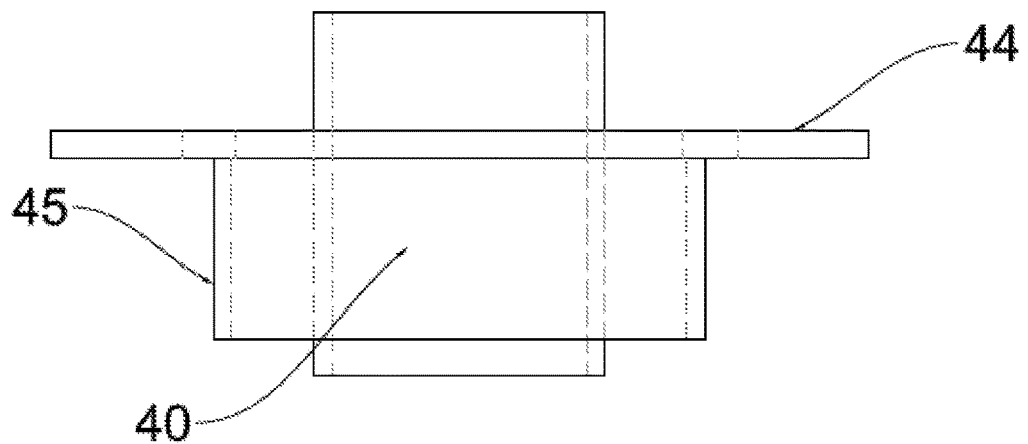
FIG. 8 is a side view of the upper guide housing as in FIG. 7.

Referring to FIGS. 7-8, the upper guide housing 40 can provide guidance and stability to the fire hydrant repair tool 10 when force is applied to the torsion handle for either removal or installation of the main valve assembly 110. In particular, the upper guide housing 40 can restrict the movement of the valve extension tube along the rotational axis and keep the main valve key fully engaged with the main valve seat ring. The upper guide housing 40 can comprise an upper plate 44 that can rest against the upper rim of the hydrant upper barrel 102. The upper plate 44 can have an outside diameter 42 that is sufficient to rest against the tops of the hydrant upper barrels of various sizes (i.e., greater than the largest inner diameter of said hydrant upper barrels). Optionally, the upper plate 44 can define bolt holes 41 to enable the upper guide housing 40 to be temporarily bolted to the hydrant body for increased guidance and stability. However, in other optional configurations, it is contemplated that the upper guide housing need not be bolted to the fire hydrant. The upper guide housing 40 can further comprise a centering ring 45 (e.g., a tubular member extending downwardly from the upper plate 44) having an outer diameter that is sized to be received within the inner bore of the hydrant upper barrel 102 with limited play in dimensions transverse to the longitudinal axis of the fire hydrant. The outer diameter of the upper guide centering ring 45 can optionally be small enough to be received inside of the hydrant upper barrel of fire hydrants of various sizes. The upper guide housing 40 can further comprise a guide tube 43 that can optionally be welded to the upper plate 44. The guide tube 43 can define an inner diameter that can receive the extension tube 30 therethrough.

Referring to FIGS. 1A-1C, and 6, bolts through the flanged connection between the bonnet and the upper barrel of the fire hydrant can be removed, and the bonnet can then be removed. With the bonnet of the fire hydrant removed, the extension tube 30/main valve key 20 assembly can be lowered into the hydrant body. Next, the extension tube guide ring 43 of the upper guide housing 40 can be slid over the extension tube 30 until the upper guide centering ring 45 is received within the upper hydrant barrel 102. Then, the torsion handle 50 can be fed through one of the receiver holes 31. With the upper guide housing 40 in place, concentricity can be maintained between the extension tube 30 and the hydrant body when tightening or loosening the threads of the main valve seat ring. The upper guide housing 40 can aid in maintaining a secure connection between the main valve key 20 and the main valve seat ring. The upper guide housing 40 can also provide structural stability to the extension tube 30 by reducing bending stress along the center axis 34 of the extension tube.

Figure 2:
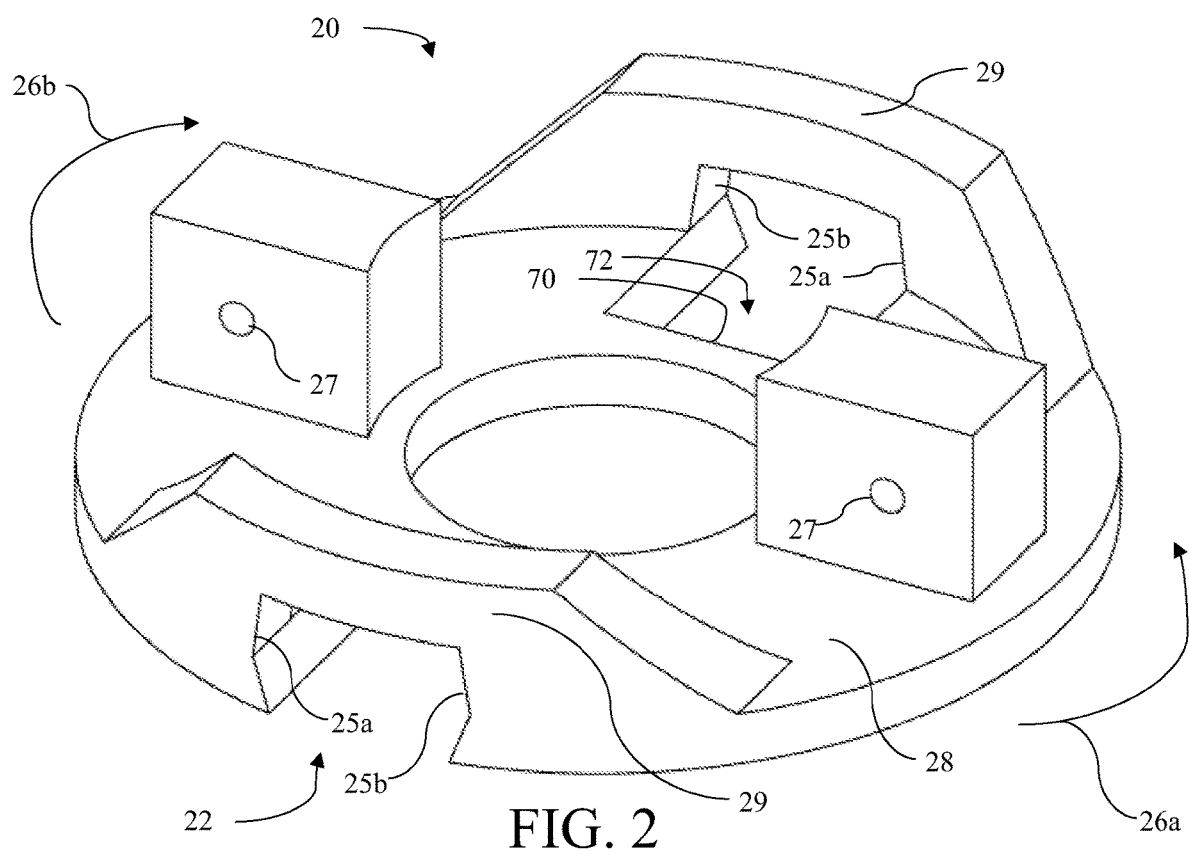
FIG. 2 is a perspective view of an exemplary main valve key of the fire hydrant repair tool as in FIG. A, the main valve key having the features for mating with the fire hydrant main valve seat ring to remove and replace the fire hydrant main valve assembly.
Figure 3:
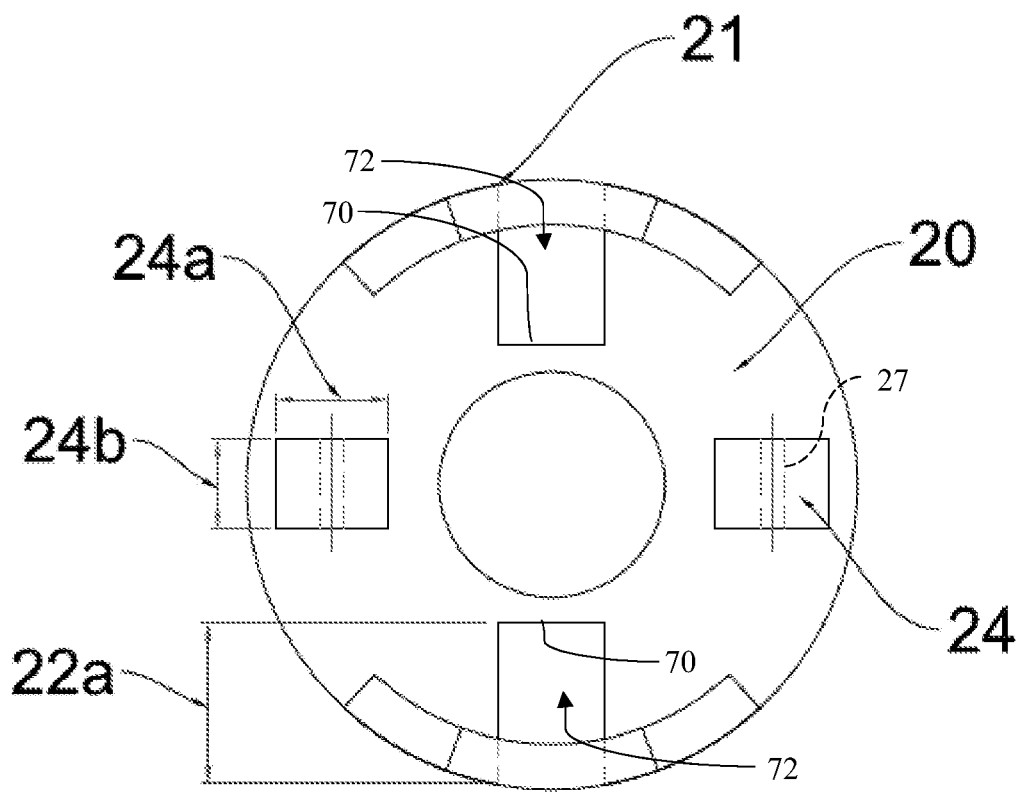
FIG. 3 is a top view of the exemplary main valve key as in FIG. 2.
Figure 10:
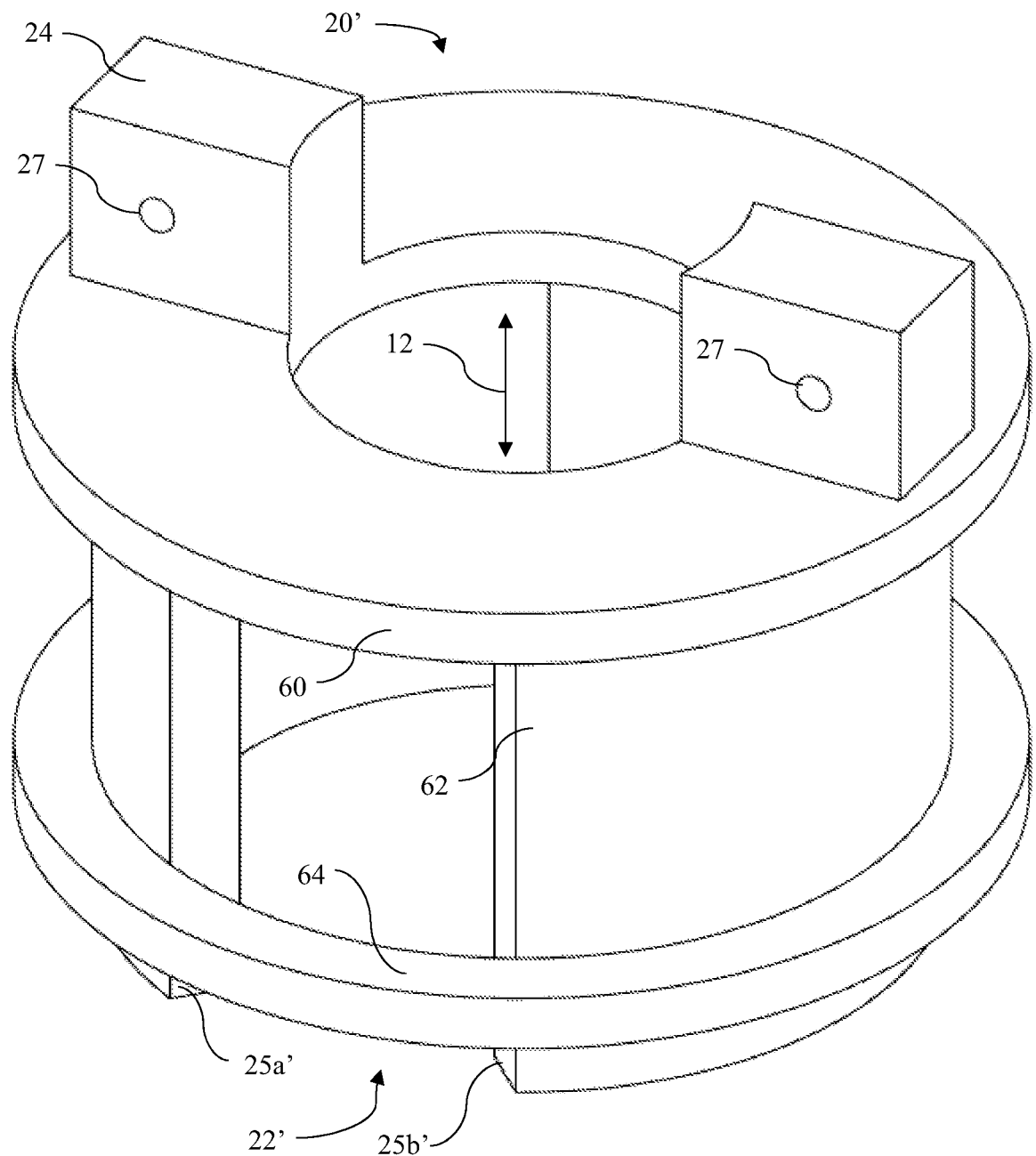
FIG. 10 is a perspective view of another exemplary valve key.

Referring to FIG. 10, in a further embodiment, a valve key 20' can be configured for engaging a different main valve (than the valve for which the valve key 20 of FIG. 2 is configured), such as a KENNEDY main valve. The valve key 20' can comprise a top plate 60 and a pair of semi-cylindrical portions 62 extending downward therefrom. The top plate 60 can have an outer diameter that is greater than that of the semi-cylindrical portions 62, and the semi-cylindrical portions 62 can be radially inset (i.e., closer to the rotational axis) relative to the circumferential edge of the top plate 60. The semi-cylindrical portions 62 can define a pair of receptacles 22' on opposite sides of the rotational axis 12, each having first surfaces 25a' and opposing second surfaces 25b'. In some aspects, the tabs of the seat ring of the main valve can have side surfaces (i.e., the surfaces that the first and second surfaces 25a', 25b' engage) that are planar or generally planar. In some optional aspects, the side surfaces of the tabs can be angled with respect to each other. For example, each of the side surfaces of the tabs can be on respective vertical planes that extend radially from the rotational axis of the main valve. Accordingly, as shown, the first and second surfaces 25a', 25b can be generally planar surfaces and can be angled with respect to each other to engage the corresponding side surfaces of the tabs of the seat ring. An outer ring 64 can couple to the outer surfaces of the semi-cylindrical portions 62 at a location spaced below the top plate 60 and above bottom edges of the semi-cylindrical portions 62. The outer ring 64 can provide stability to the semi-cylindrical portions 62. Further, the tabs of the outer ring can optionally be radially inset from the outer circumference of the seat ring 120 (FIG. 1D), and the outer ring 64 can position the first surface 25a' and second surface 25b' to engage the tabs in their radially inset locations. Still further, the outer ring 64 can optionally provide a vertical stop that can rest against a portion of the main valve so that the first and second surfaces 25a', 25b engage the tabs at a desired vertical position. The top plate 60 can be sufficiently spaced from the distal (lower) ends of the semi-cylindrical portions 62 so that the vertical projections 128 of the upper plate 124 remain below the top plate 60 as the receptacles 22' engage the tabs of the seat ring.

In some aspects, a kit can comprise an extension tube and a plurality of main valve keys that are configured to engage the main valves of different valve types (e.g., valves provided by various brands or manufacturers) and different valve sizes (e.g., small, optionally, 4.25 inch and large, optionally, 5.25 inch). The plurality of main valve keys can comprise at least a first and a second main valve key, wherein each of the first and second main valve keys defines receptacles having different geometry. For example, referring to FIGS. 2-4, the spacing between the opposing first and second surfaces 25a and 25b can be greater for the first main valve key than the second main valve key. In further aspects, the height 22b of the receptacle 22 of the first main valve key can be greater or less than the height 22b of the receptacle 22 of the second main valve key. In still further aspects, each key of the plurality of keys can differ from each of the other keys in receptacle depth 22a, height, 22b, or width 22c. In still further aspects, the main valve keys can differ in the angle between the first surface 25a and the second surfaces 25b. In yet further aspects, the main valve keys can differ in radial positioning of the first and second surfaces 25a, 25b relative to the outer circumference of the main valve key. In other aspects, the main valve keys can receive the vertical projections 128 of the upper plate 124 in different ways (e.g., with notches 70 as in FIG. 2 or sufficient vertical spacing to the top plate 60 as in FIG. 10). In some aspects, the kit can comprise between two and ten different valve keys. For example, the kit can comprise main valve keys for both a large size and a small size for five different brands of valve keys (e.g., CLOW, KENNEDY, AMERICAN FLOW CONTROL, U.S. PIPE, and MUELLER), totaling ten main valve keys. This can eliminate the need to carry multiple brand-specific repair tools on a maintenance vehicle. The kit can further comprise an upper guide housing 40 and/or a torsion bar 50. In further aspects, the kit can comprise a rack to which each of the main valve keys can be selectively coupled to when not in use. In further aspects, the shaft, upper guide housing, and/or torsion bar can be mounted to the rack. Optionally, the rack can be configured to fit in a vehicle (e.g., a hydrant repair vehicle).

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A fire hydrant repair tool for removing a main valve of a fire hydrant, the main valve having a central rotational axis, an upper surface, a first ring tab extending upwardly from the upper surface, and a second ring tab extending upwardly from the upper surface opposite the first ring tab relative to a radial axis that is perpendicular to the rotational axis, wherein each of the first and second ring tabs have a first side and a second side, the fire hydrant repair tool comprising: a valve key comprising: a first receptacle and a second receptacle that are configured to receive, respectively, the first and second ring tabs, wherein each of the first and second receptacles defines: a first face that is configured to bias against the first side of a respective ring tab of the first and second ring tabs, and a second face that is configured to bias against the second side of a respective ring tab of the first and second ring tabs; and a shaft having a longitudinal axis, a first end, and a second end that is spaced from the first end relative to the longitudinal axis, wherein the first end of the shaft is coupled to the valve key.

Aspect 2: The fire hydrant repair tool of aspect 1, wherein the shaft is coupled to the valve key via integral formation.

Aspect 3: The fire hydrant repair tool of aspect 1, wherein the shaft is removably coupled to the valve key.

Aspect 4: The fire hydrant repair tool of aspect 3, further comprising at least one locking pin, wherein the valve key defines a first through hole, wherein the shaft defines a second through hole that is axially aligned with the first through hole, wherein the at least one locking pin extends through the first through hole and the second through hole.

Aspect 5: The fire hydrant repair tool of any one of the preceding aspects, wherein the valve key comprises a first mounting block and a second mounting block, wherein the first mounting block defines the first through hole, wherein the second mounting block defines a third through-hole, wherein the shaft comprises a first pair of parallel plates that are spaced to receive the first mounting block and a second pair of parallel plates that are spaced to receive the second mounting block, wherein the first pair of parallel plates collectively define the second through-hole, wherein the second pair of parallel plates collectively define a fourth through-hole that is aligned with the third through hole, wherein the at least one locking pin comprises a first locking pin that extends through the first and second through-holes and a second locking pin that extends through the third and fourth through-holes.

Aspect 6: The fire hydrant repair tool of any one of the preceding aspects, wherein each face of the first and second faces of the first and second receptacles defines at least one tooth.

Aspect 7: The fire hydrant repair tool of any one of the preceding aspects, wherein the main valve further comprises an upper plate comprising a first vertical projection positioned between the first ring tab and the rotational axis and a second vertical projection positioned between the second ring tab and the rotational axis, wherein the valve key defines an opening that is configured to receive a respective vertical projection of the first and second vertical projections.

Aspect 8: The fire hydrant repair tool of any one of the preceding aspects, further comprising a torsion handle coupled to the shaft at a position spaced from the first end of the shaft, wherein the torsion handle extends transverse to the longitudinal axis of the shaft.

Aspect 9: The fire hydrant repair tool of aspect 8, wherein the torsion handle is removably coupled to the second end of the shaft.

Aspect 10: The fire hydrant repair tool of aspect 8 or aspect 9, wherein the shaft defines a plurality of through-holes spaced along the longitudinal axis, wherein at least a portion of the torsion handle is received within one of the plurality of through holes.

Aspect 11: The fire hydrant repair tool of any one of the preceding aspects, wherein the shaft defines an inner diameter that is configured to receive a stem of the fire hydrant.

Aspect 12: The fire hydrant repair tool of any one of the preceding aspects, wherein the fire hydrant has an upper portion having an interior bore and a central axis, the fire hydrant repair tool further comprising: a guide housing, wherein the guide housing comprises a plate that has a major dimension that is greater than the interior bore of the fire hydrant, wherein the guide housing defines an inner bore through which the shaft can be received, wherein the guide housing is configured to be coupled to the fire hydrant to limit movement of the guide housing transverse to the central axis of the fire hydrant.

Aspect 13: The fire hydrant repair tool of aspect 12, wherein the plate of the guide housing defines at least one through-hole that is configured to align with a vertical through hole in the fire hydrant.

Aspect 14: The fire hydrant repair tool of aspect 12 or aspect 13, wherein the guide housing further comprises a guide ring that is sized to be received within the interior bore of the fire hydrant.

Aspect 15: A method comprising: coupling a valve key to a shaft to form a valve key and shaft assembly, wherein the valve key defines: a first receptacle and a second receptacle that are configured to receive, respectively, first and second ring tabs of a main valve of a fire hydrant, wherein each of the first and second receptacles defines: a first face that is configured to bias against the first side of a respective ring tab of the first and second ring tabs, and a second face that is configured to bias against the second side of a respective ring tab of the first and second ring tabs;
    lowering the valve key into the fire hydrant until the first and second ring tabs of the fire hydrant are received within the first and second receptacles of the valve key; and
    applying a torque to the shaft to decouple the main valve from a body of the fire hydrant.

Aspect 16: The method of aspect 15, further comprising: sliding a guide housing over the shaft, wherein the guide housing comprises a plate that has a major dimension that is greater than an interior bore of the fire hydrant, wherein the guide housing defines an inner bore through which the shaft can be received, wherein the guide housing is configured to be coupled to hydrant to limit movement of the guide housing transverse to the central axis of the fire hydrant; and coupling a torsion handle to the shaft.

Aspect 17: The method of aspect 15 or aspect 16, wherein the shaft defines a plurality of pairs of spaced through holes, wherein coupling the torsion handle to the shaft comprises inserting a portion of the torsion handle through a pair of holes of the plurality of spaced through holes.

Aspect 18: A kit comprising: a shaft; and a plurality of valve keys, each valve key comprising: a first receptacle and a second receptacle that are configured to receive, respectively, first and second ring tabs of a particular fire hydrant main valve, wherein each of the first and second receptacles defines: a first face that is configured to bias against the first side of a respective ring tab of the first and second ring tabs, and a second face that is configured to bias against the second side of a respective ring tab of the first and second ring tabs.

Aspect 19: The kit of aspect 18, further comprising: a torsion handle that is configured to couple to the shaft; and a guide housing, wherein the guide housing comprises a plate that has a major dimension that is greater than the interior bore of the fire hydrant, wherein the guide housing defines an inner bore through which the shaft can be received, wherein the guide housing is configured to be coupled to hydrant to limit movement of the guide housing transverse to a central axis of the fire hydrant.

Aspect 20: The kit of aspect 18 or aspect 19, wherein the plurality of valve keys comprise first and second valve keys, and wherein the first valve key differs from the second valve key in one or more of: geometry of the first and second receptacles; or dimensions of the first and second receptacles.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A fire hydrant repair tool for removing a main valve of a fire hydrant, the main valve having a central rotational axis, an upper surface, a first ring tab extending upwardly from the upper surface, and a second ring tab extending upwardly from the upper surface opposite the first ring tab relative to a radial axis that is perpendicular to the rotational axis, wherein each of the first and second ring tabs have a first side and a second side, the fire hydrant repair tool comprising:
    a valve key comprising:
        a first face that is configured to bias against a first side of a respective one of the first or second ring tabs; and
        a second face that is configured to bias against a second side of said respective one of the first or second ring tabs; and
    a shaft having a longitudinal axis, a first end, and a second end that is spaced from the first end relative to the longitudinal axis, wherein the first end of the shaft is coupled to the valve key,
    wherein the shaft is coupled to the valve key via integral formation.

2. The fire hydrant repair tool of claim 1, wherein the main valve further comprises an upper plate comprising a first vertical projection positioned between the first ring tab and the rotational axis and a second vertical projection positioned between the second ring tab and the rotational axis, wherein the valve key defines an opening that is configured to receive a respective vertical projection of the first and second vertical projections.

3. A method comprising:
    using the valve key as in claim 1 to engage the main valve comprising the first ring tab and the second ring tab.

4. The method of claim 3, further comprising:
    prior to using the first valve key to engage the main valve, lowering the valve key into the fire hydrant until said respective one of the first and second ring tabs of the fire hydrant is received between the first face and the second face; and
    applying a torque to the shaft to decouple the main valve from a body of the fire hydrant.

5. The method of claim 4, further comprising:
    sliding a guide housing over the shaft, wherein the guide housing comprises a plate that has a major dimension that is greater than an interior bore of the fire hydrant, wherein the guide housing defines an inner bore through which the shaft can be received, wherein the guide housing is configured to be coupled to hydrant to limit movement of the guide housing transverse to the central axis of the fire hydrant; and
    coupling a torsion handle to the shaft.

6. The method of claim 4, wherein the shaft defines a plurality of pairs of spaced through holes, wherein coupling the torsion handle to the shaft comprises inserting a portion of the torsion handle through a pair of holes of the plurality of spaced through holes.

7. A fire hydrant repair tool for removing a main valve of a fire hydrant, the main valve having a central rotational axis, an upper surface, a first ring tab extending upwardly from the upper surface, and a second ring tab extending upwardly from the upper surface opposite the first ring tab relative to a radial axis that is perpendicular to the rotational axis, wherein each of the first and second ring tabs has a first side and a second side, the fire hydrant repair tool comprising:
    a valve key comprising:
        a first face that is configured to bias against a first side of a respective one of the first or second ring tabs; and
        a second face that is configured to bias against a second side of said respective one of the first or second ring tabs, wherein each face of the first and second faces defines at least one tooth; and
    a shaft having a longitudinal axis, a first end, and a second end that is spaced from the first end relative to the longitudinal axis, wherein the first end of the shaft is coupled to the valve key, wherein the shaft is removably coupled to the valve key,
    wherein the valve key further comprises a first mounting block and a second mounting block, wherein the first mounting block defines the first through hole, wherein the second mounting block defines a third through-hole, wherein the shaft comprises a first pair of parallel plates that are spaced to receive the first mounting block and a second pair of parallel plates that are spaced to receive the second mounting block, wherein the first pair of parallel plates collectively define the second through-hole, wherein the second pair of parallel plates collectively define a fourth through-hole that is aligned with the third through hole, wherein the at least one locking pin comprises a first locking pin that extends through the first and second through-holes and a second locking pin that extends through the third and fourth through-holes.

8. The fire hydrant repair tool of claim 7, further comprising a torsion handle coupled to the shaft at a position spaced from the first end of the shaft, wherein the torsion handle extends transverse to the longitudinal axis of the shaft.

9. The fire hydrant repair tool of claim 8, wherein the torsion handle is removably coupled to the second end of the shaft.

10. The fire hydrant repair tool of claim 9, wherein the shaft defines a plurality of through-holes spaced along the longitudinal axis, wherein at least a portion of the torsion handle is received within one of the plurality of through holes.

11. The fire hydrant repair tool of claim 7, wherein the shaft defines an inner diameter that is configured to receive a stem of the fire hydrant.

12. The fire hydrant repair tool of claim 7, wherein the fire hydrant has an upper portion having an interior bore and a central axis, the fire hydrant repair tool further comprising:
    a guide housing, wherein the guide housing comprises a plate that has a major dimension that is greater than the interior bore of the fire hydrant, wherein the guide housing defines an inner bore through which the shaft can be received, wherein the guide housing is configured to be coupled to the fire hydrant to limit movement of the guide housing transverse to the central axis of the fire hydrant.

13. The fire hydrant repair tool of claim 12, wherein the plate of the guide housing defines at least one through-hole that is configured to align with a vertical through hole in the fire hydrant.

14. The fire hydrant repair tool of claim 13, wherein the guide housing further comprises a guide ring that is sized to be received within the interior bore of the fire hydrant.

15. The fire hydrant repair tool of claim 7, further comprising at least one locking pin, wherein the valve key defines a first through hole, wherein the shaft defines a second through hole that is axially aligned with the first through hole, wherein the at least one locking pin extends through the first through hole and the second through hole.

16. The fire hydrant repair tool of claim 15, wherein the valve key comprises a first mounting block and a second mounting block, wherein the first mounting block defines the first through hole, wherein the second mounting block defines a third through-hole, wherein the shaft comprises a first pair of parallel plates that are spaced to receive the first mounting block and a second pair of parallel plates that are spaced to receive the second mounting block, wherein the first pair of parallel plates collectively define the second through-hole, wherein the second pair of parallel plates collectively define a fourth through-hole that is aligned with the third through hole, wherein the at least one locking pin comprises a first locking pin that extends through the first and second through-holes and a second locking pin that extends through the third and fourth through-holes.

17. A method comprising:
using the valve key as in claim 7 to engage the main valve comprising the first ring tab and the second ring tab.

18. A kit comprising:
a plurality of valve keys, each valve key configured to engage a main valve comprising a first ring tab and a second ring tab, each of the first ring tab and the second ring tab having a first side and a second side, each valve key comprising:
a first face that is configured to bias against the first side of a respective one of the first or second ring tabs; and
a second face that is configured to bias against the second side of said respective one of the first or second ring tabs.

19. The kit of claim 18, further comprising a shaft that is configured to selectively couple to each respective valve key of the plurality of valve keys.

* * * * *